United States Patent
Brehmer et al.

(10) Patent No.: US 7,157,682 B2
(45) Date of Patent: Jan. 2, 2007

(54) METHOD AND APPARATUS FOR A CMOS IMAGE SENSOR WITH A DISTRIBUTED AMPLIFIER

(75) Inventors: Kevin E. Brehmer, Morgan Hill, CA (US); Ozan E. Erdogan, San Jose, CA (US)

(73) Assignee: Zoran Corporation, Sunnyvale, CA (US)

( * ) Notice: Subject to any disclaimer, the term of this patent is extended or adjusted under 35 U.S.C. 154(b) by 0 days.

(21) Appl. No.: 09/957,343

(22) Filed: Sep. 19, 2001

(65) Prior Publication Data

US 2002/0011554 A1    Jan. 31, 2002

Related U.S. Application Data

(63) Continuation of application No. 09/613,582, filed on Sep. 12, 2000, now abandoned, which is a continuation of application No. 09/113,395, filed on Jul. 10, 1998, now Pat. No. 6,130,423.

(51) Int. Cl.
*H01L 27/00* (2006.01)
*H04N 5/335* (2006.01)

(52) U.S. Cl. .................................. 250/208.1; 348/308
(58) Field of Classification Search ............. 250/208.1, 250/214 R, 214 A, 214.1; 348/241, 301, 348/302, 307–310; 257/290–292
See application file for complete search history.

(56) References Cited

U.S. PATENT DOCUMENTS 5,923,369 A * 7/1999 Merrill et al. ........... 250/208.1
6,130,423 A * 10/2000 Brehmer et al. ......... 250/208.1

\* cited by examiner

*Primary Examiner*—Kevin Pyo
(74) *Attorney, Agent, or Firm*—Lowrie, Lando & Anastasi, LLP

(57) ABSTRACT

A CMOS image sensor circuit having a distributed amplifier is disclosed. The CMOS image sensor circuit is constructed using a photo sensor that converts light intensity to into voltage, a reset transistor to charge the photo sensor, and a distributed amplifier to detect and read out the voltage value created by the photo sensor. The distributed amplifier is distributed in the sense that portions of the amplifier circuitry reside within individual pixel circuits that form a CMOS image sensor array. The remainder of the amplifier resides in a column read out circuit that is at the bottom of the CMOS image sensor array.

25 Claims, 8 Drawing Sheets

METHOD AND APPARATUS FOR A CMOS IMAGE SENSOR WITH A DISTRIBUTED AMPLIFIER

RELATED APPLICATIONS

This application is a continuation of U.S. patent application having Ser. No. 09/613,582, filed Sep. 12, 2000, now abandoned, which is a continuation of U.S. patent application having Ser. No. 09/113,395, filed Jul. 10, 1998, now issued as U.S. Pat. No. 6,130,423.

FIELD OF THE INVENTION

The present invention relates to the field of image sensor circuits. In particular the present invention discloses a CMOS image sensor having a distributed amplifier.

BACKGROUND OF THE INVENTION

Jet Propulsion Laboratories (JPL) of Pasadena, Calif. introduced a new type if image sensor circuit known as a CMOS image sensor. A CMOS image sensor is an integrated circuit that measures light by detecting a voltage change produced by a photo sensor. Specifically, a photo sensor is charged to a predetermined voltage value and then allowed to integrate by being exposed to a light source. The voltage value of the photo sensor is then read out by a read-out circuit consisting of a transistor.

Existing CMOS image sensors have proved useful for some applications. However, there are problems with existing CMOS image sensors. For example, individual CMOS image sensors in an array do not behave uniformly therefore a CMOS image sensor array must be calibrated with a uniform image, such as a gray plane, before use. The dynamic range of existing CMOS image sensors is limited such that images with large light variation are difficult to capture. Existing CMOS image sensor circuits are highly susceptible to noise problems. Specifically, the read-out of a CMOS image sensor pixel circuit may affect the integration of an adjacent CMOS image sensor pixel circuit. Existing CMOS image sensors also exhibit undesirable nonlinear behavior. Due to the problems associated with existing CMOS image sensor circuits, an improved CMOS image sensor circuit would be desirable.

SUMMARY OF THE INVENTION

A CMOS image sensor circuit having a distributed amplifier is disclosed. The CMOS image sensor circuit is constructed using a photo sensor that converts light intensity into voltage, a reset transistor to charge the photo sensor, and a distributed amplifier to detect and read out the voltage value created by the photo sensor.

The distributed amplifier is distributed in the sense that portions of the amplifier circuitry reside within individual pixel circuits that form a CMOS image sensor array. The remainder of the amplifier resides in a column read out circuit that is at the bottom of the CMOS image sensor array.

Other objects, features, and advantages of present invention will be apparent from the company drawings and from the following detailed description.

BRIEF DESCRIPTION OF THE DRAWINGS

The objects, features and advantages of the present invention will be apparent to one skilled in the art, in view of the following detailed description in which.

DETAILED DESCRIPTION OF THE PREFERRED EMBODIMENT

A method and apparatus for distributed amplifier CMOS image sensor circuit is disclosed. In the following description, for purposes of explanation, specific nomenclature and specific implementation details are set forth to provide a thorough understanding of the present invention. However, it will be apparent to one skilled in the art that these specific details are not required in order to practice the present invention. For example, the present invention has been described with reference to N-Well process technologies. However, the same teachings can easily be applied to other types of process technologies.

A CMOS Image Sensor Array

Figure 1:
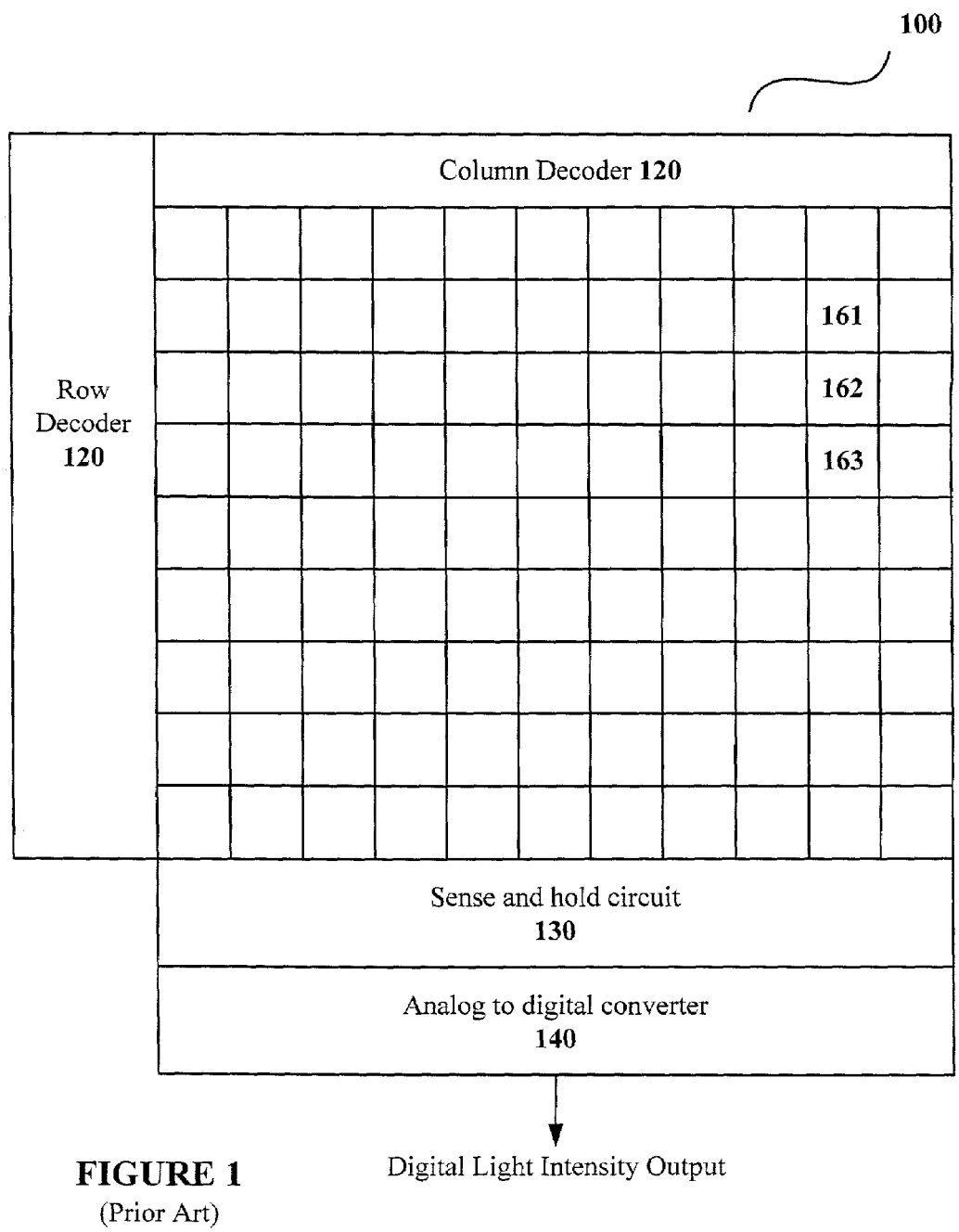
FIG. 1 illustrates a block diagram of a typical CMOS Image Sensor Array.

FIG. 1 illustrates a block diagram of a typical CMOS image sensor array. Each element in the array (such as array elements 161, 162, and 163) is an individual CMOS image sensor circuit. The individual CMOS image sensor circuits are also known as pixel circuits.

The CMOS image sensor array of FIG. 1 is controlled by row decoder 110 and a column decoder 120. The row decoder 110 and column decoder 120 select a particular CMOS image sensor circuit to be activated. The output of an activated CMOS image sensor circuit is carried down a column output line to a sense and hold circuit 130. The sense and hold circuit 130 senses the voltage value of an activated CMOS image sensor circuit. Finally, the sensed voltage value is converted into a digital value by an analog to digital converter 140.

A CMOS image sensor array is similar to a Dynamic Random Access Memory (DRAM) array except that instead of individual memory cells that are set and later tested, a CMOS image sensor array has individual CMOS image sensor circuits that are set to an initial voltage value and then sensed after light sampling. Furthermore, a CMOS image sensor array differs from a DRAM array in that the output voltage is quantized by an analog to digital converter.

A CMOS Image Sensor Pixel

Figure 2:
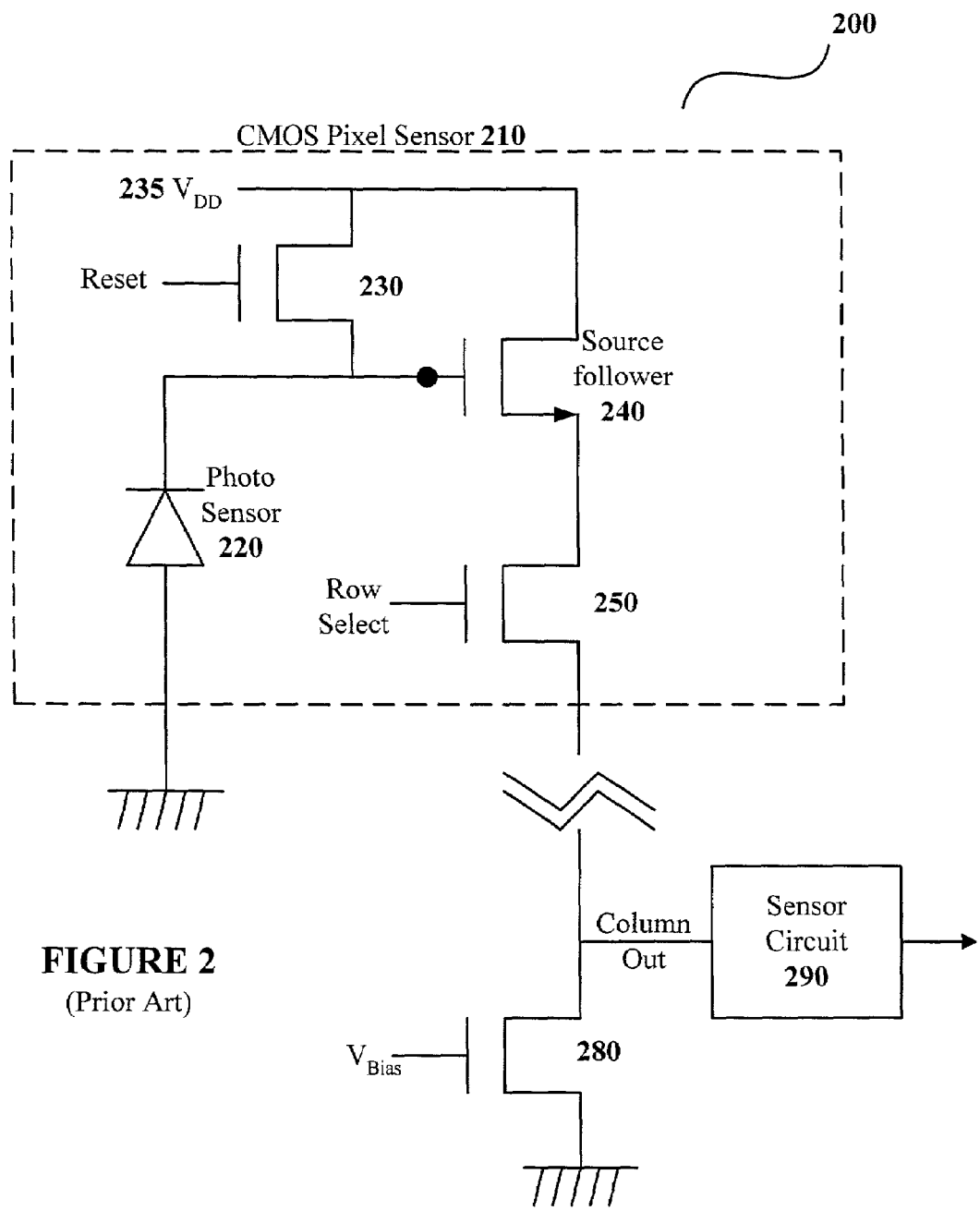
FIG. 2 illustrates a Prior Art CMOS image sensor circuit.

FIG. 2 illustrates an individual CMOS image sensor pixel circuit 210. The CMOS image sensor circuit consists of a reset transistor 230, a photo sensor 220, a source-follower transistor 240, and a row select transistor 250.

Also illustrated in FIG. 2 is one possible output circuit that processes the output of the CMOS image sensor circuit 210. The output circuit consists of a current source transistor 280 and a sensor circuit 290.

The CMOS image sensor circuit 210 operates in three phases: reset, integration, and read-out. The operational phases of the CMOS image sensor circuit 210 will be described with reference to FIG. 3 which displays the gate voltage of the source follower transistor 240 of the CMOS image sensor circuit during the operation of the CMOS image sensor circuit 210.

Figure 3:
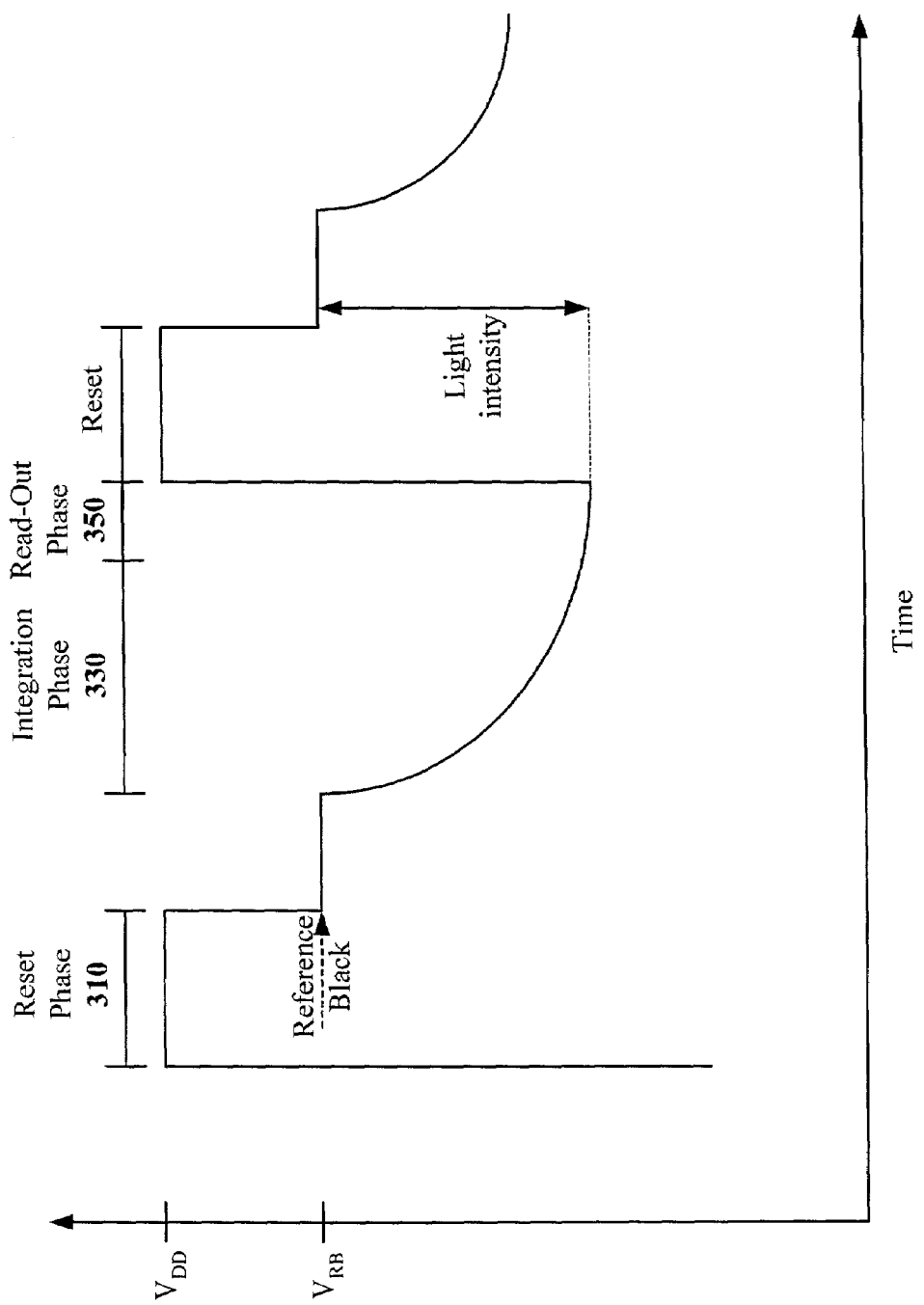
FIG. 3 illustrates a voltage graph that illustrates the operation of a CMOS sensor image.

Initially, during a reset phase 310 of FIG. 3, the photo sensor 220 is charged by reset transistor 230 to a reset voltage level using voltage source $V_{DD}$. The actual voltage level achieved is $V_{DD}-V_{TN}$ since there is a voltage drop across the reset transistor 230. The charged voltage level is known as the "reference black" voltage level ($V_{RB}$).

Next, during an integration phase 330, the photo sensor 220 is exposed to a light source to be measured. The photons that strike the photo sensor 220 will cause electrons to leak through the photo sensor 220. The voltage level of the remaining charge on the photo sensor 220 is proportional to the number of photons that strike the photo sensor 220. Thus, during the integrate phase 330 the voltage level of the gate on the source follower 240 will drop. A white level is reached as the photo sensor approaches the negative power supply (Ground). A black level occurs when no photons are integrated such that the photo sensor voltage essentially remains at the original reference black voltage level ($V_{RB}=V_{DD-VTN}$).

Finally, during a read-out phase 350, the row select transistor 250 will be activated such that the gate voltage level of the source follower transistor 240 will be measured using sensor circuit 290. In one embodiment, the measurement of the photo sensor voltage is performed by using a Correlated Double Sampling circuit (CDS). First, the integrated photo sensor voltage signal is sampled. Then the CMOS image sensor circuit is reset and the reset voltage is sampled for a reference black value. The desired signal is the difference between the integrated signal voltage and the photo sensor reset voltage.

Figure 4:
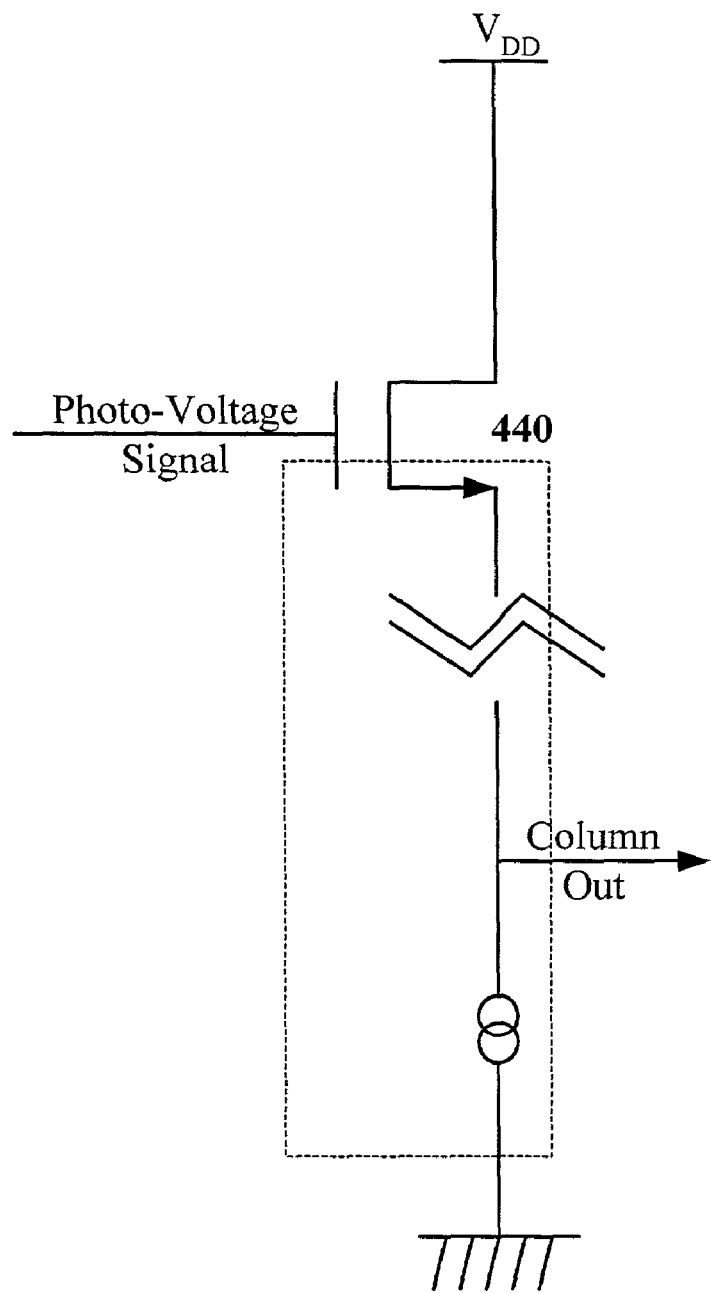
FIG. 4 illustrates a simplified CMOS image sensor circuit with problems highlighted.

As discussed in the background, the existing CMOS image sensor circuits have several known problems. One problem with existing CMOS image sensors is that slight differences between the transistors in the different CMOS image sensor pixels causes fixed pattern noise in captured images. FIG. 4 illustrates a portion of a CMOS image sensor and read-out circuit. Differences in the transistor threshold voltage, $V_T$, between adjacent pixels will cause different voltage levels at the source of source follower 440 for the same gate voltage. Thus, fixed pattern noise is created within the CMOS image sensor.

The threshold voltage ($V_T$) is made up of two parts: a zero bias term and a bias point dependent term. The zero bias term is, in part, process dependent. For example, the zero bias term is affected by the surface implant dose under the channel of the transistor. The voltage dependent term or body effect term, is a function of the back bias voltage between the source and body of the source follower transistor 440. The source follower transistor 440 within each pixel exhibits a linearity error, as the voltage on the photo sensor changes from the reset voltage to ground. Typically, the source follower transistor 440 should have unity gain. However, body effect on the source follower and row select transistors will result in a changing gain level. Specifically, the gain of the source follower transistor 440 will vary as the photo sensor voltage varies. This nonlinear gain behavior is an undesirable effect for a high performance image sensor.

Existing CMOS image sensor circuit also have very limited dynamic range. Resetting the photo sensor to a reference voltage level by connecting the gate of a reset transistor to $V_{DD}$ results in a loss of dynamic range of the photo sensor voltage as seen by the Correlated Double Sampling (CDS) circuit due to threshold voltage drops across transistors. For example, assume a power supply voltage of 3.0 Volts ($V_{DD}=3.0V$), a threshold voltage drop of 1.0 Volt ($V_{TN}=1.0V$), and a transistor saturation voltage of 0.25 Volts ($V_{DSAT}=0.25V$). The reference voltage ($V_{RB}$) will be the power supply voltage minus a transistor voltage drop. Thus, the reset voltage ($V_{RB}$) equals $V_{DD}-V_{TN}$, or 3.0V-1.0V=2.0V. This reference voltage is then level shifted by the source follower and applied to the sensor circuit. The output voltage variation seen by the sensor circuit is from $V_{DD}-V_{TN}-V_{TN}-V_{DSAT}$ to $V_{DSAT}$. In our example, the output signal (Col_Out) varies from a high of 3.0V-1.0V-1.0V=0.25V=0.75V to a low of 0.25V. Thus, existing CMOS image sensors may only have a small maximum dynamic range of 0.5V (0.75V-0.25) for a standard 3.0 Volt power supply system. The $V_{TN}$ threshold voltage drops results in a loss of a large amount the available signal level. Thus a large amount of the dynamic range of the light level of the sensor is lost.

A Distributed Amplifier for CMOS Image Sensor Pixel

To remedy a number of the known problems of existing CMOS image sensors, the present invention introduces the concept of a CMOS image sensor with a distributed amplifier. The distributed amplifier circuit provides a linear output from the CMOS image sensor circuit and may be used to increase the dynamic range of the CMOS image sensor circuit.

Figure 5:
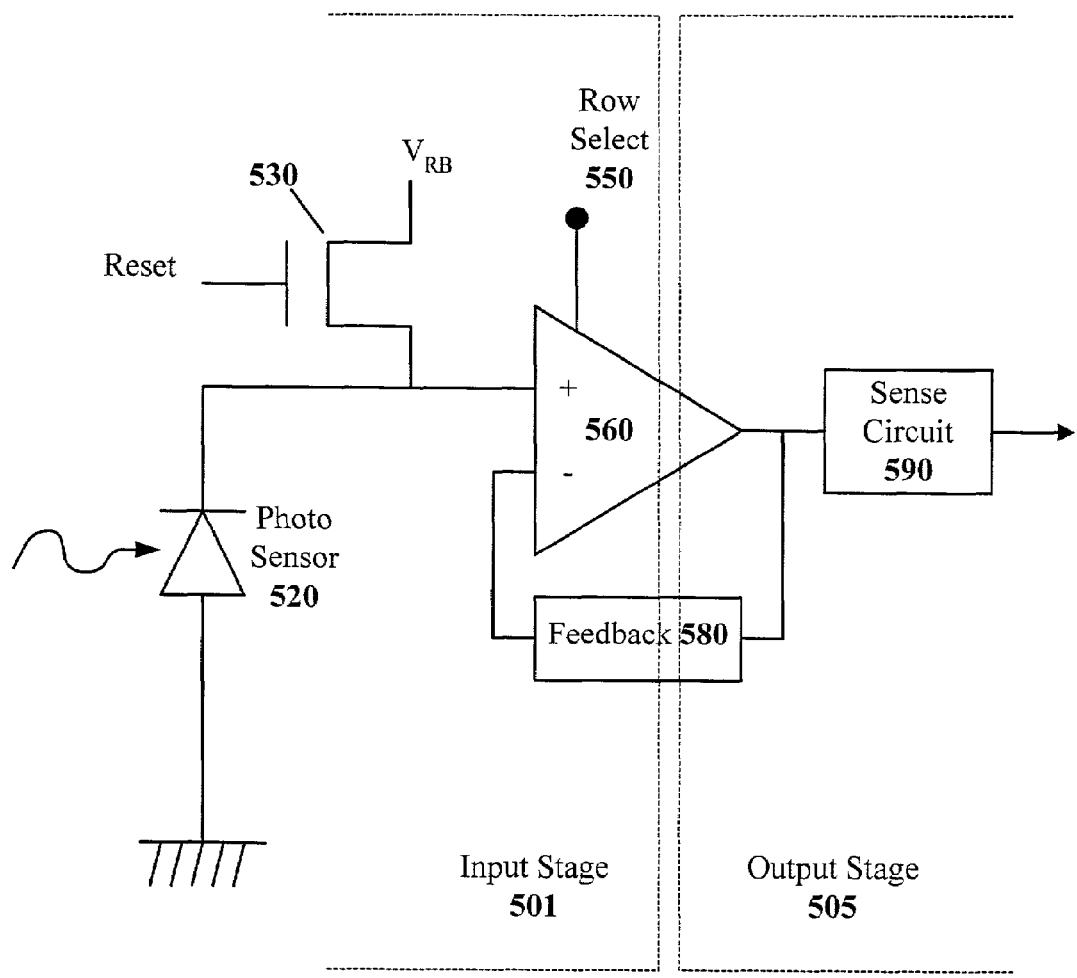
FIG. 5 illustrates a block diagram of a distributed amplifier CMOS image sensor circuit.

FIG. 5 illustrates a block diagram of a CMOS image sensor with a distributed amplifier. In the CMOS image sensor of FIG. 5, a photo sensor circuit 520 is used to detect light. The photo sensor circuit 520 may be a conventional photo diode, a photo gate circuit, or any other circuit that translates light into a voltage value. The photo sensor circuit 520 is set to a reference voltage value by a reset transistor 530. The voltage level produced by the photo sensor circuit 520 after it has integrated is processed by an amplifier 560. The amplifier 560 is controlled by a row select input line 550 such that the amplifier does not affect the voltage level produced by the photo sensor circuit 520 until the row select is enabled.

The amplifier 560 of FIG. 5 is illustrated with a feedback block 580 that may be used for setting a gain value. Various gain values may be used. However, a direct connection feedback that provides a simple unity gain value has been found to provide good results. A unity gain amplifier outputs the same input voltage value but will provide buffering for the sense circuit 590.

To operate within a CMOS image sensor array, the amplifier is divided into two different stages: an input stage portion 501 and an output stage portion 505. A few of the components of the input stage portion 501 of the amplifier 560 are located within the CMOS image sensor pixel circuit. The remainder of the components from the amplifier input stage and the components from the output stage of the amplifier 560 are located within the sensor circuit at the bottom of the CMOS image sensor array. Thus, most components of the distributed amplifier 560 can be shared by CMOS image sensor pixel circuits that share the same column in the CMOS image sensor array. For example, referring back to FIG. 1, CMOS image sensor circuits 161, 162, and 163 would all share the same distributed amplifier output stage circuitry down in the sense circuit 130 at the bottom of the array.

In the proposed distributed amplifier CMOS image sensor, any nonlinear behavior caused by the source follower transistor is eliminated by the use of the distributed unity gain amplifier within each pixel and column circuit. Provided that the open loop gain of the distributed amplifier is high enough, any nonlinear behavior in the amplifier signal swings are not an issue. Thus, the proposed distributed amplifier CMOS image sensor circuit provides approximately a tens times improvement in linearity over prior art CMOS image sensor circuit solutions.

Three different detailed implementations of a distributed amplifier CMOS image sensor circuit are provided to disclose the teachings of the present invention in detail. The three distributed amplifier CMOS image sensor circuit embodiments will be described using an N-Well CMOS Process Technology, a photo diode sensor, and a unity gain distributed amplifier. However, many variations of known technologies can be used to implement the distributed amplifier CMOS image sensor circuits. For example, a different process technology may be used to fabricate the CMOS image sensor circuits. Examples of other process technology that may be used include NMOS, PMOS DRAM or Embedded DRAM, and P-Well CMOS Process Technology. Furthermore, the photo sensor can be implemented with a photo diode or photo-gate sensor. Also, as previously set forth, different amplifier gain values may be used.

A First Distributed Amplifier CMOS Image Sensor Circuit Embodiment

Figure 6:
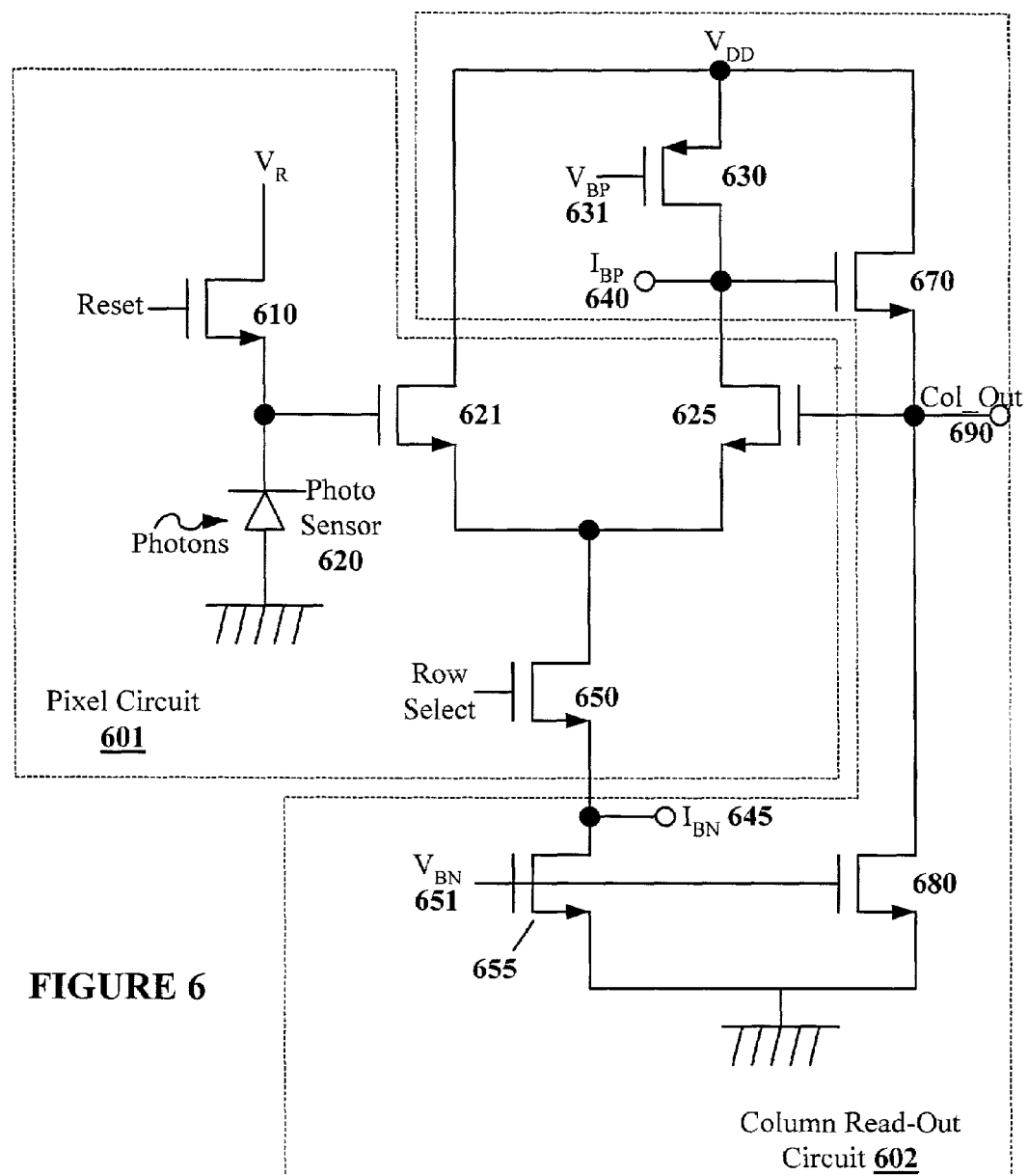
FIG. 6 illustrates a first detailed embodiment of a distributed amplifier CMOS image sensor circuit.

FIG. 6 illustrates a first embodiment of a distributed amplifier CMOS image sensor circuit. In the embodiment of FIG. 6, the CMOS image sensor circuit includes a conventional photo sensor 620 and reset transistor 610. However, to improve dynamic range, the reset voltage signal applied to the reset transistor (usually provided by the power supply voltage $V_{DD}$) is greater than the reference voltage ($V_R$) used to charge the photo sensor 620. This arrangement ensures that the photo sensor is charged to the full reference voltage ($V_R$). In one embodiment, the reset voltage signal is set to 3 Volts and the reference voltage ($V_R$) is set to 2 Volts.

The reference voltage $V_R$ is derived from a bandgap voltage reference which has low sensitivity to power supply variation, temperature variation, and process variation. This ensures that the reset voltage of each column will match the adjacent column reset voltage so that fixed pattern noise is eliminated. Thus, charging the photo sensor to a well regulated $V_R$ improves both the dynamic range of the sensor and the Fixed Pattern Noise of the sensor.

Further extension of the dynamic range of the photo sensor 620 can be obtained if the reset voltage $V_R$ connects to a regulated voltage closer to the power supply voltage $V_{DD}$. To keep the pixel size down, an NMOS transistor is used in the pixel. Thus, in order to charge the photo sensor 620 to a voltage higher than 2V, the reset transistor 610 would be implemented with a high voltage transistor. A high voltage transistor can be implemented by many different silicon process technologies. The gate of this high voltage reset transistor 610 is connected to a voltage level from $V_{DD}$ to two times $V_{DD}$ thereby allowing the photo sensor 620 reset phase (reference) voltage $V_R$ to approach the power supply voltage $V_{DD}$ while still regulated from the power supply voltage $V_{DD}$.

In the distributed amplifier CMOS image sensor circuit, the voltage from the photo sensor 620 is sensed by a distributed unity gain amplifier circuit. In the embodiment of FIG. 6, the unity gain amplifier input stage consists of a matched differential input pair of transistors (621 and 625), a tail current source load made from row select transistor 650 and transistor 655, and current source load transistor 630. Row select transistor 650 activates the amplifier operation, by supplying the tail current to the input stage of the amplifier.

The amplifier output stage consists of a source follower buffer created from transistors 670 and 680. In FIG. 6, the output of the amplifier input stage, node IBP 640, connects to the gate of transistor 670 of the output stage of the amplifier. Furthermore, connecting the source of transistor 670 and the drain of transistor 680 to the gate of input stage transistor 625 forms the feedback necessary to produce the unity gain amplifier structure.

To implement the distributed amplifier CMOS image sensor circuit of FIG. 6 into a CMOS image sensor array, some of the transistors comprising the input stage are placed into each pixel. The remainder of the-input stage transistors and output stage transistors are placed in the readout circuit, at the bottom of each column and shared by the various pixel rows within the CMOS image sensor array.

In the first embodiment illustrated in FIG. 6, reset transistor 610, differential input pair 621 and 625, and row select transistor 650 reside within the CMOS image sensor pixel circuit 601. The CMOS image sensor circuit uses a reset signal and a row select as inputs. A Col_Out 690 signal is used as a feedback input for the amplifier first stage in the CMOS image sensor pixel circuit 601. The CMOS image sensor pixel circuit 601 produces two output values, $I_{BP}$ 640 and $I_{BN}$ 645, that are used as inputs to the column read-out circuit 602. The electrical power requirements of the CMOS image sensor pixel circuit 601 are provided by a reference voltage ($V_R$), a power supply voltage source ($V_{DD}$), and ground (GND).

The remainder of the distributed amplifier transistors (transistors 630, 655, 670, and 680) are implemented in the column read-out circuit 602 located at the bottom of a CMOS image sensor array. The $I_{BP}$ 640 and $I_{BN}$ 645 signals output by the CMOS image sensor pixel circuit 601 are used as inputs to the column read-out circuit 602. The column read-out circuit 602 also uses two other inputs $V_{BP}$ 631 and $V_{BN}$ 651 that are generated by a bias generator cell. The bias generator cell (not shown) has matched current sources that are mirrored by transistors 630 and 655 into the input stage differential pair and mirrored by transistors 670 and 680 into the output stage of the distributed unity gain amplifier. The power requirements of the column read-out circuit 602 are provided by a voltage source ($V_{DD}$) and ground (GND).

The distributed amplifier of the present invention reduces noise coupling that could be caused by a read out of one row affecting another row that is integrating. In the distributed amplifier, the row select transistor 650 within each CMOS image sensor pixel circuit is used turn on or off the distributed amplifier for each row. An inactive row will have differential input transistor 625 off such that only gate source overlap capacitance will couple to the integrating photo diode in an attenuated manner. The attenuating effects of the common source node of input stage differential pair 621 and 625 within the CMOS image sensor pixel circuit 601 greatly reduces read-out coupling effects experienced in prior art CMOS image sensor pixel circuit designs.

The distributed amplifier CMOS image sensor circuit of FIG. 6 begins with a reset phase, followed by an integration phase, and completed by another reset phase. The initial reset phase turns on the reset transistor 610 that charges the photo sensor 620 to a voltage reference value ($V_R$). The unity gain amplifier buffers the signal from photo sensor 620 and provides the necessary drive at the column output (Col_Out), for the sampling phase by sampling circuit. In a preferred embodiment, the sampling circuit comprises a Correlated Double Sampler (CDS) Circuit.

A Second Distributed Amplifier CMOS Image Sensor Circuit Embodiment

Figure 7:
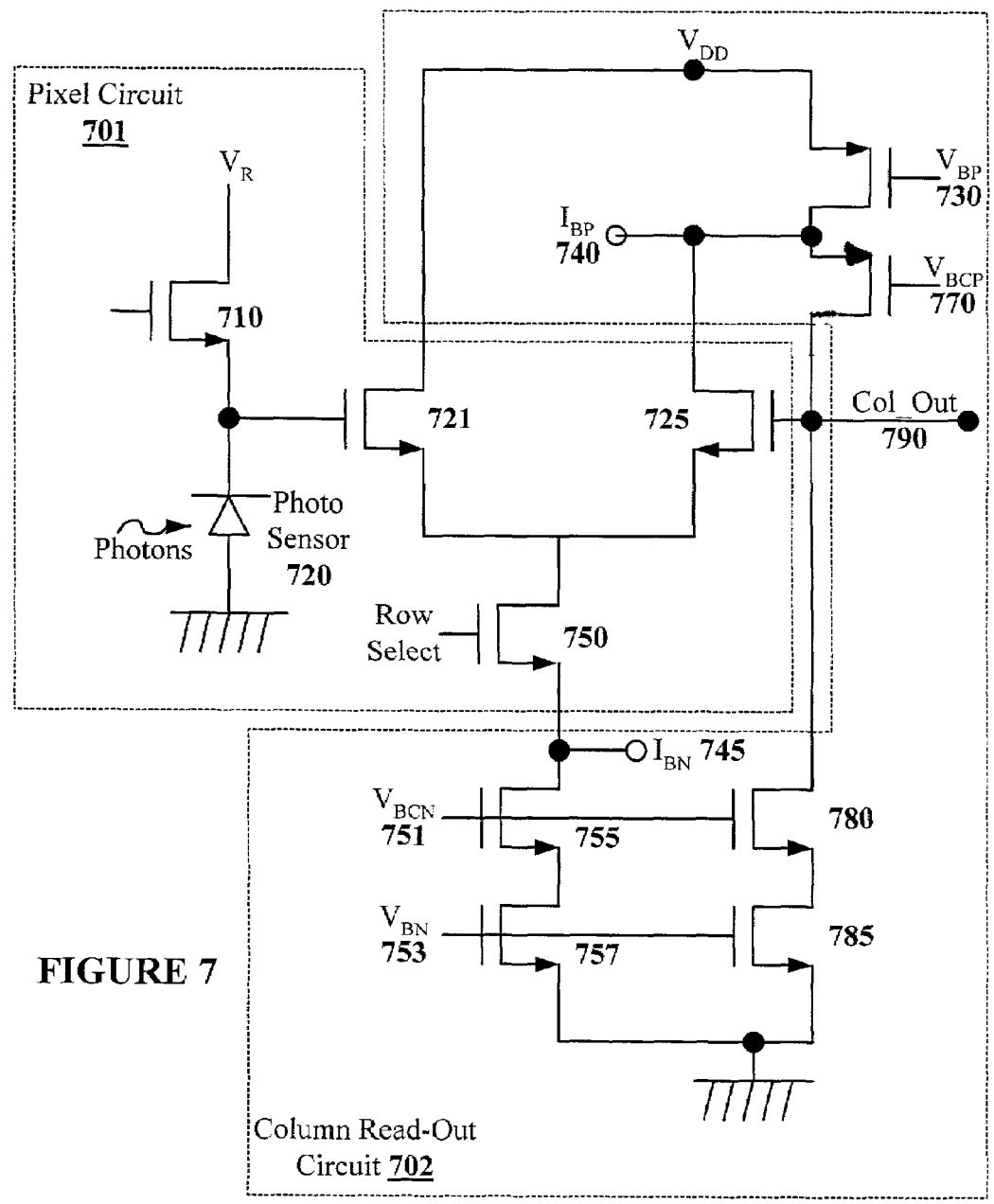
FIG. 7 illustrates a second detailed embodiment of a distributed amplifier CMOS image sensor circuit having greater dynamic range.

FIG. 7 illustrates a second embodiment of a distributed amplifier CMOS image sensor circuit. The embodiment of FIG. 7 provides greater dynamic range than the embodiment of FIG. 6.

In the embodiment of FIG. 7, the CMOS image sensor pixel circuit 701 is the same as the CMOS image sensor pixel circuit 601 in the first disclosed embodiment. Specifically, the photo sensor 720, the reset transistor 710, differential input transistor pair 721 and 725, and row select transistor 750 all reside within the CMOS image sensor pixel circuit. Thus, the CMOS image sensor pixel circuit 701 also requires the same inputs and generate the same outputs. However, the column read-out circuit 702 of the embodiment in FIG. 7 is different.

In the embodiment of FIG. 7, the amplifier input stage consists of a matched differential input transistor pair 721 and 725 and a tail current source load. However, the tail current source of the FIG. 7 embodiment differs from the FIG. 6 embodiment since the FIG. 7 embodiment uses three transistors: row select transistor 750 and transistors 755 and 757. It is possible to implement the tail source without transistor 755 by connecting the drain of transistor 757 to node $I_{BN}$ 745

The amplifier output stage in FIG. 7 consists of positive and negative current source loads that are generated from a matched current source bias generator. The negative current source load consists of the NMOS cascode transistor pair 780 and 785. Transistor 780 is the cascoding transistor. The cascoding transistor 780 may be omitted by connecting the drain of transistor 785 directly to the column output (Col_Out) 790. The positive current source load consists of the PMOS cascode transistor pair 730 and 770. Note that transistor 730 is a current source load for both the input and output stages since the drain of transistor 730 is coupled to differential input transistor 725. Connecting the drain of output stage transistors 770 and 780 to the gate of transistor 725 forms the feedback necessary to produce the unity gain amplifier structure.

The column read-out circuit 702 illustrated in FIG. 7 requires the following input signals: $I_{BP}$, $I_{BN}$, $V_{BN}$, $V_{BCN}$, $V_{BP}$ and $V_{BCP}$. The $I_{BP}$ 740 and $I_{BN}$ 745 input signals to the column read-out circuit 702 are output by the CMOS image sensor pixel circuit 701. The column read-out circuit 702 input signals $V_{BN}$, $V_{BCN}$, $V_{BP}$, and $V_{BCP}$ are all generated by a bias generator cell. The bias generator cell (not shown) has matched current sources that are mirrored by transistors 730, 755, 757 into the input stage differential transistor pair, and mirrored by transistors 730, 770, 780, 785 into the output stage of the distributed unity gain amplifier.

The column read-out circuit generates a column output (Col_Out) as an output signal. Feedback from the amplifier output to the amplifier inverting input is applied by connecting the drain of transistors 770 and 780 to the gate of differential transistor 725. This closed loop amplifier configuration creates a unity gain amplifier, whereby the column output (Col_Out) signal is buffered and equals the input photo sensor signal.

In the embodiment of FIG. 7 the dynamic range within the CMOS image sensor circuit is further extended by the distributed unity gain amplifier of FIG. 7. Specifically, the amplifier positive common mode range can be extended to $V_{DD}-2(V_{DSAT})$. This enables the reference voltage $V_R$ to extend to $V_{DD}-2(V_{DSAT})$. In one example, the reference voltage $V_R$ would be set to 3 Volts−2(0.25 Volts)=2.5 Volts wherein $V_{DD}$=3 Volts and $V_{DSAT}$=0.25 Volts. This arrangement requires a high voltage transistor for the reset transistor 710.

The unity gain amplifier will make the column output (Col_Out) voltage signal follow the large dynamic range of the photo sensor signal. The column output (Col_Out) will continue to follow the photo sensor voltage signal even as the tail current source transistor 780 begins to go out of saturation. The dynamic range of the column output (Col_Out) signal may vary from a high of $V_R$ to a low of $V_{TN}+2(V_{DSAT})$. Thus, with the improved reference voltage level of 2.5 Volts ($V_R$=2.5V), the dynamic range of the column output (Col_Out) signal is 1.0 volt. Specifically, the dynamic range varies from the reference voltage value of 2.5 Volts ($V_R$=2.5V) to the low value of $V_{TN}-2(V_{DSAT})$ or 1.0V−2(0.25V)=1.5V such that the dynamic range of CMOS image sensor circuit is 2.5V−1.5V=1.0 Volt.

A Third Distributed Amplifier CMOS Image Sensor Circuit Embodiment

Figure 8:
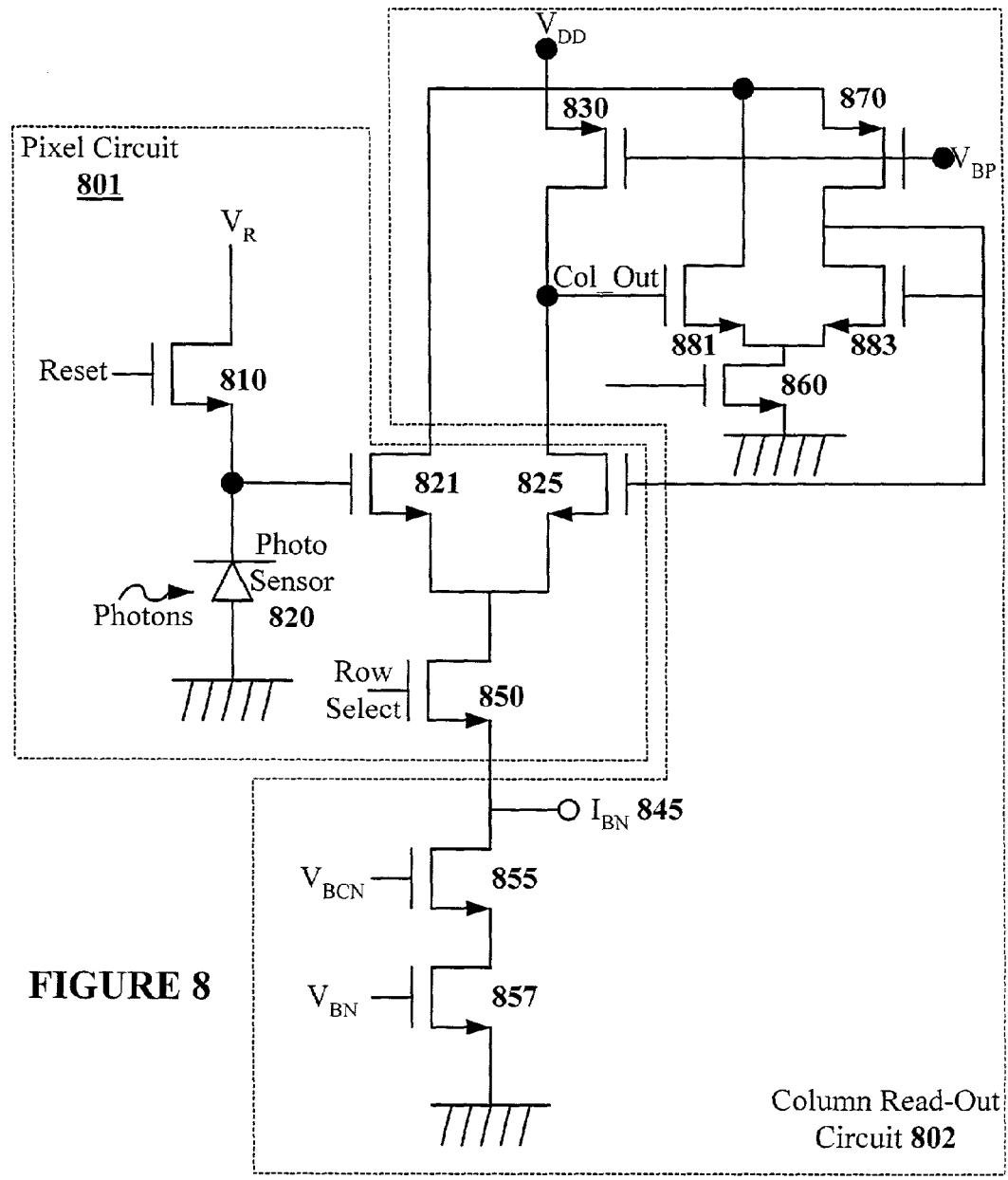
FIG. 8 illustrates a third detailed embodiment of a distributed amplifier CMOS image sensor circuit having greater dynamic range.

FIG. 8 illustrates a third embodiment of a distributed amplifier CMOS image sensor circuit. The embodiment of FIG. 8 again uses the same CMOS image sensor pixel circuit 801 disclosed in the previous two embodiments. However, the embodiment of FIG. 8 uses a different column read-out circuit 802.

The input stage of the distributed amplifier in the embodiment of FIG. 8 is the same as the amplifier input stage disclosed in FIG. 7. Specifically, the amplifier input stage consists of a matched differential input transistor pair 821 and 825 and a tail current source load constructed with three transistors: row select transistor 850, and transistor 855 and 857. Again, it is possible to implement the tail source without transistor 855 by connecting the drain of transistor 857 to node $I_{BN}$ 845.

The output stage of the distributed amplifier in the embodiment of FIG. 8 consists of a differential transistor pair (881 and 883) in a unity gain feedback configuration, a tail current source transistor 860, and a matched current source transistor 870. The current source transistor 870 can be replaced with a current mirror that mirrors the drain current of transistor 881. After the integration phase, a feedback loop consisting of matching differential transistors 881 and 883, and input stage transistor 825 force the column output value (Col_Out) to follow the voltage level generated by photo-sensor 820.

The embodiment of FIG. 8 is more complex than previous embodiments, but the embodiment of FIG. 8 provides an even greater dynamic range than previous embodiments. Referring to the amplifier second stage in the embodiment of FIG. 8, the power supply voltage $V_{DD}$ only travels through one transistor before reaching the column output (Col_Out) signal. Thus, the amplifier input range is extended up to $V_{DD}-V_{DSAT}$. This allows the reference voltage $V_R$ to also be extended to $V_{DD}-V_{DSAT}$ by using a high voltage transistor for the reset transistor 810. Therefore, using the same values from the previous examples, the dynamic range for the embodiment of FIG. 8 varies from a high of $V_{DD}-$ $V_{DSAT}$=3V−0.25V=2.75V to a low value of $V_{TN}$+2 ($V_{DSAT}$)=1V+0.5V=1.5V. Thus the dynamic range of the CMOS image sensor circuit embodiment of FIG. 8 is 2.75V−1.5V=1.25V.

The foregoing has described a distributed amplifier CMOS image sensor. It is contemplated that changes and modifications may be made by one of ordinary skill in the art, to the materials and arrangements of elements of the present invention without departing from the scope of the invention.

We claim:

1. A method of detecting light with an image sensor array, said method comprising:
   charging a photo sensor to a reference voltage level;
   integrating photons with said photo sensor to generate a photo voltage; and
   amplifying said photo voltage with a distributed amplifier having a distributed feedback loop, said distributed amplifier having a distributed feedback loop comprising
      a first portion of said distributed amplifier and distributed feedback loop in a pixel circuit in said image sensor array, said first portion comprising a differential transistor pair wherein one transistor in said differential transistor pair is coupled to a current source load, and
      a second portion of said distributed amplifier and distributed feedback loop residing in a read-out circuit coupled to said image sensor array.

2. The method as claimed in claim 1 wherein said second portion of said distributed amplifier comprises an active load circuit.

3. The method as claimed in claim 2 wherein said active load circuit comprises a cascode second stage.

4. The method as claimed in claim 1 wherein said distributed amplifier produces unity gain.

5. The method as claimed in claim 1 wherein said distributed amplifier is fabricated using N-Well process technology.

6. The method as claimed in claim 1 further comprising:
   activating an input stage of said distributed amplifier with a row select transistor.

7. The method as claimed in claim 1 wherein a second stage of said distributed amplifier comprises a cascoding transistor.

8. The method as claimed in claim 1 wherein a second stage of said distributed amplifier comprises a differential transistor pair in a unity gain feedback configuration.

9. The method as claimed in claim 1 wherein said image sensor array is implemented with CMOS logic.

10. The method as claimed in claim 1 further wherein said distributed amplifier comprises a shared tail current source load first stage and a cascode second stage.

11. An image sensor array, said image sensor array comprising:
   a photo sensor, said photo sensor for detecting photons to generate a photo voltage value;
   a reset circuit, said reset circuit for charging said photo sensor; and
   a distributed amplifier, said distributed amplifier for amplifying said photo voltage value, said distributed amplifier comprising
      a first portion of said distributed amplifier residing in a pixel circuit in said image sensor array, said first portion comprising a differential transistor pair wherein one of said differential transistors is coupled to a current source load,
      a second portion of said distributed amplifier residing in a read-out circuit coupled to said image sensor array, and
      a distributed feedback loop wherein current from said second portion of said distributed amplifier in said read-out circuit is fed back to said first portion of said distributed amplifier residing in said image sensor array.

12. The image sensor array as claimed in claim 11 wherein said second portion of said distributed amplifier comprises an active load circuit.

13. The image sensor array as claimed in claim 12 wherein said active load circuit comprises a cascode second stage.

14. The image sensor array as claimed in claim 11 wherein said distributed amplifier produces unity gain.

15. The image sensor array as claimed in claim 11 wherein said distributed amplifier is fabricated using N-Well process technology.

16. The image sensor array as claimed in claim 11 wherein said distributed amplifier comprises a shared tail current source load first stage and a cascode second stage.

17. The image sensor array as claimed in claim 11 wherein a second stage of said distributed amplifier comprises a cascoding transistor.

18. The image sensor array as claimed in claim 11 wherein a second stage of said distributed amplifier comprises a differential transistor pair in a unity gain feedback configuration.

19. The image sensor array as claimed in claim 11 wherein said image sensor array is implemented with CMOS logic.

20. The image sensor array as claimed in claim 11 wherein an input stage of said distributed amplifier is activated by a row select transistor.

21. An image sensor array, said image sensor array comprising:
   photo sensing means for detecting photons to generate a photo voltage;
   a reset circuit, said reset circuit for charging said photo sensing means; and
   amplifier means for amplifying said photo voltage, said amplifier means comprising
      a first portion residing in a pixel circuit in said image sensor array, said first portion comprising a differential transistor pair wherein only one transistor in said differential transistor pair is coupled to a current source load,
      a second portion residing in a read-out circuit coupled to said image sensor array, and
      a distributed feedback loop, said distributed feedback loop supplying current from said second portion residing in said read-out circuit to said first portion residing in said pixel circuit in said image sensor array.

22. The image sensor array as claimed in claim 21 wherein said photo sensing means comprises a photo diode.

23. The image sensor array as claimed in claim 21 wherein said second portion of said amplifier means comprises an active load circuit.

24. The image sensor array as claimed in claim 21 wherein said second portion of said amplifier means comprises a cascoding transistor.

25. The image sensor array as claimed in claim 21 wherein said second portion of said amplifier means comprises a differential transistor pair in a unity gain feedback configuration.

* * * * *

UNITED STATES PATENT AND TRADEMARK OFFICE
CERTIFICATE OF CORRECTION

PATENT NO.        : 7,157,682 B2
APPLICATION NO.   : 09/957343
DATED             : January 2, 2007
INVENTOR(S)       : Kevin E. Brehmer et al.

It is certified that error appears in the above-identified patent and that said Letters Patent is hereby corrected as shown below:

In column 4, line 3, "circuit" should read -- circuits --.
In column 4, line 23, "drop" should read -- drops --.
In column 5, line 14, "is" should read -- are --.
In column 5, line 16, "tens" should read -- ten --.
In column 6, line 25, "the-input" should read -- the input --.
In column 7, line 26, "generate" should read -- generates --.

Signed and Sealed this

Twenty-seventh Day of March, 2007

JON W. DUDAS
*Director of the United States Patent and Trademark Office*